United States Patent [19]

Zabler

[11] Patent Number: 4,649,340
[45] Date of Patent: Mar. 10, 1987

[54] MAGNETIC DIFFERENTIAL POSITION SENSOR

[75] Inventor: Erich Zabler, Stutensee, Fed. Rep. of Germany

[73] Assignee: Robert Bosch GmbH, Stuttgart, Fed. Rep. of Germany

[21] Appl. No.: 468,411

[22] Filed: Feb. 22, 1983

[30] Foreign Application Priority Data

Mar. 11, 1982 [DE] Fed. Rep. of Germany ....... 3208785

[51] Int. Cl.[4] .............. G01B 7/14; H01F 21/02; G08C 19/06
[52] U.S. Cl. .................................. 324/207; 324/226; 336/45; 340/870.35; 303/20; 303/DIG. 3
[58] Field of Search ................. 324/207, 208, 226; 340/870.35; 336/45; 303/20, DIG. 3, DIG. 4

[56] References Cited

U.S. PATENT DOCUMENTS

| 3,100,889 | 8/1963 | Cannon | 340/870.35 |
| 4,132,980 | 1/1979 | Zabler | 340/870.35 |

FOREIGN PATENT DOCUMENTS

| 2352851 | 2/1978 | Fed. Rep. of Germany . | |
| 2924092 | 1/1981 | Fed. Rep. of Germany . | |
| 0489010 | 1/1976 | U.S.S.R. | 324/207 |
| 0568960 | 8/1977 | U.S.S.R. | 324/207 |
| 0615355 | 6/1978 | U.S.S.R. | 324/207 |
| 870921 | 10/1981 | U.S.S.R. | 324/208 |

Primary Examiner—Ernest F. Karlsen
Assistant Examiner—Walter E. Snow
Attorney, Agent, or Firm—Frishauf, Holtz, Goodman & Woodward

[57] ABSTRACT

To determine the relative position of two objects, for example pistons (16, 22) respectively responsive to the deflection of a brake pedal (10) and actual braking pressure of a wheel of a wheel brake (18) in an automotive power assisted braking system, a core having salient poles, such as an H or E core, has windings wound on the core, coupled to sensing circuits which determine the inductance of the winding, upon placement of short-circuit rings, or coupling magnets on, or adjacent to the core to affect the magnetic circuit, and hence the inductance of the winding. The inductance of the winding can be sensed by connecting the core in an oscillatory circuit (FIG. 3B), applying alternating current thereto, respectively inversely phased (FIG. 4B) and determining phasing of output, or connecting the coils in a multivibrator circuit (FIG. 4C), the output, upon balance of the magnetic circuits, being a pulse train of unity duty cycle upon balance; or connecting the coils to a supply voltage such that the magnetic circuit in a center leg of the salient poles will be in opposition, and sensing the flux in the center leg by an additional sensing coil (FIGS. 5A, 6), which flux will be exactly balanced if the magnetic circuits of the respective salient poles are balanced due to uniform position, or uniform change of position, of the respective magnetic elements, such as magnets or short-circuit rings.

18 Claims, 13 Drawing Figures

MAGNETIC DIFFERENTIAL POSITION SENSOR

REFERENCE TO RELATED PUBLICATIONS

German Published Patent Application DE-AS No. 23 52 851, WECKENMANN; German Patent Disclosure Document DE-OS No. 29 24 092, ZABLER et al; both assigned to the assignee of this application.

The present invention relates to a position sensor to determine the relative position of at least two objects, and more particularly to determine the difference in a position of at least two movable objects with respect to a reference.

BACKGROUND

Various types of sensors are used to determine the position of an object with respect to a reference. One type of such sensor is a short-circuit ring sensor described, for example, in German Published Patent Application DE-AS No. 23 52 851, WECKENMANN, assigned to the assignee of the present application. This publication discloses a ferromagnetic core, which may be open or closed, and is, preferably, elongated. A coil is located on the core. A short-circuit ring is movable in longitudinal direction with respect to the core. More than one ring may be provided, the ring being arranged to move with respect to the core without, for example, touching the core. It is made of electrically conductive material. The sensor operates on the basis that the inductance of the coil changes with the position of the ring. Either the ring is moved, or the core is moved, thereby determining the position of an object with respect to a reference position, in dependence on which ones of the elements—ring or core—are deemed fixed.

German Patent Disclosure Document DE-OS No. 29 24 092, ZABLER et al., describes a short-circuit ring sensor of the type previously disclosed having a double-U core, on which two short-circuit rings can move, independently of each other. To determine the position of an object, one of the rings is moved with respect to the core; the other ring is moved only slightly, and utilized for calibration purposes.

The sensors so described require comparatively complex circuits to analyze the output measuring signals; the sensors are not designed to determine the differential position of two relatively movable objects.

Automatic braking systems in automotive vehicles may require obtaining output signals representative of the position of the difference of two pistons. German Patent Disclosure Document DE-OS No. 31 24 755 and corresponding U.S. Ser. No. 382,456, filed May 24, 1982, now U.S. Pat. No. 4,462,642, describes a system which is arranged to determine the differential position of two pistons in such automotive braking systems, in which one of the pistons is operative in dependence on the deflection of a brake pedal in the vehicle, and the other piston moves in independence on the actual effective braking pressure. The relative positions of the pistons with respect to each other must be determined in order to permit control of the actual braking pressure considering the relationship of the cross sections of the two pistons. A sensor with an integrated Hall element has been proposed to effect such sensing.

THE INVENTION

It is an object to provide a relative position or differential position sensor, in which the respective relative positions of two movable elements with respect to each other are sensed, and provide a corresponding output signal, which is easily analyzed.

Briefly, a magnetic core is provided, having a yoke and a plurality of salient legs, each forming, in combination with the yoke, a magnetic circuit. A first winding is located on one of the salient legs; a second winding is located on a second one of the salient legs. The first and second windings are serially connected.

Two magnetic circuit control elements are coupled to the legs on which the windings are wound, and, additionally, respectively coupled to the two objects—for example pistons—the relative position of which is to be determined. An inductance sensing circuit is coupled to the windings to evaluate the inductance of the magnetic circuit which includes the salient legs and the windings.

In accordance with a feature of the invention, the magnetic circuit control means are short-circuit rings which can slide on the salient legs, without contact. Calibration magnets may be located in the air gap between some of the salient legs.

The relative position sensor, in accordance with a feature of the invention, is particularly suited to determine the relative deflection of a brake pedal of a motor vehicle and a brake piston, or the like; the brake pedal, or a hydraulic piston which moves in a path dependent on that of the deflection of the brake pedal is coupled to one of the short-circuit rings, whereas a piston moved by the hydraulic braking system is coupled to another one of the short-circuit rings.

In accordance with a feature of the invention, the core may be a double-U core having two serially connected coils positioned on salient legs located in one axis; in accordance with another feature of the invention, the core is an E-core having outer salient legs on which two serially connected coils are wound, and on which the short-circuit rings are movably positioned.

The inductance sensing means may, for example, be part of an oscillator, in which the inductance of the magnetic circuit determines, at least in part, the frequency of the oscillator. In accordance with a feature of the invention, the inductance sensing means may also comprise a source of alternating current connected to one of the coils directly, and, with inverse phasing, to the other of the coils, so that, at the junction of the serially connected coils, a zero voltage output will be obtained if the short-circuit rings are on similar positions of the respective legs, so that the differential position of the two rings—coupled to the respective objects, for example pistons of the braking system—is zero or null.

The system has the advantage that the sensors can be simply constructed, and that the evaluation circuits, likewise, are simple. If the sensors utilize, for example, two U-cores with an evaluation circuit in form of an oscillator, the frequency of which is determined by the inductance of the magnetic circuit, a particularly simple evaluation arrangement is provided since the inductance of only a single magnetic circuit, that is, only a single inductivity, need be evaluated. If coils are phased in opposition to each other and supplied with alternating current, measurements of high precision with analog frequency, are available which permit particularly accurate control, with respect to a command value of differential positions of the respective objects coupled to the short-circuit rings.

In accordance with a feature of the invention, a multileg ferromagnetic core can be provided on which a plurality of coils are so positioned that a plurality of open or closed magnetic circuits results, corresponding to the number of objects, the position of which is to be analyzed. An E-shaped core is particularly suitable, having two serially connected coils located on the outer salient legs; the inwardly positioned salient leg has a further coil connected thereto which will provide a voltage representative of the respective position of short-circuit rings. This system has the advantage of substantial simplicity since only a single supply voltage is necessary, and evaluation is simple. A plurality of independent measuring points can be evaluated with a single apparatus.

The system is particularly suitable to determine the positional difference of two pistons in the braking circuit of an automotive vehicle.

DRAWINGS

DETAILED DESCRIPTION

Figure 1:
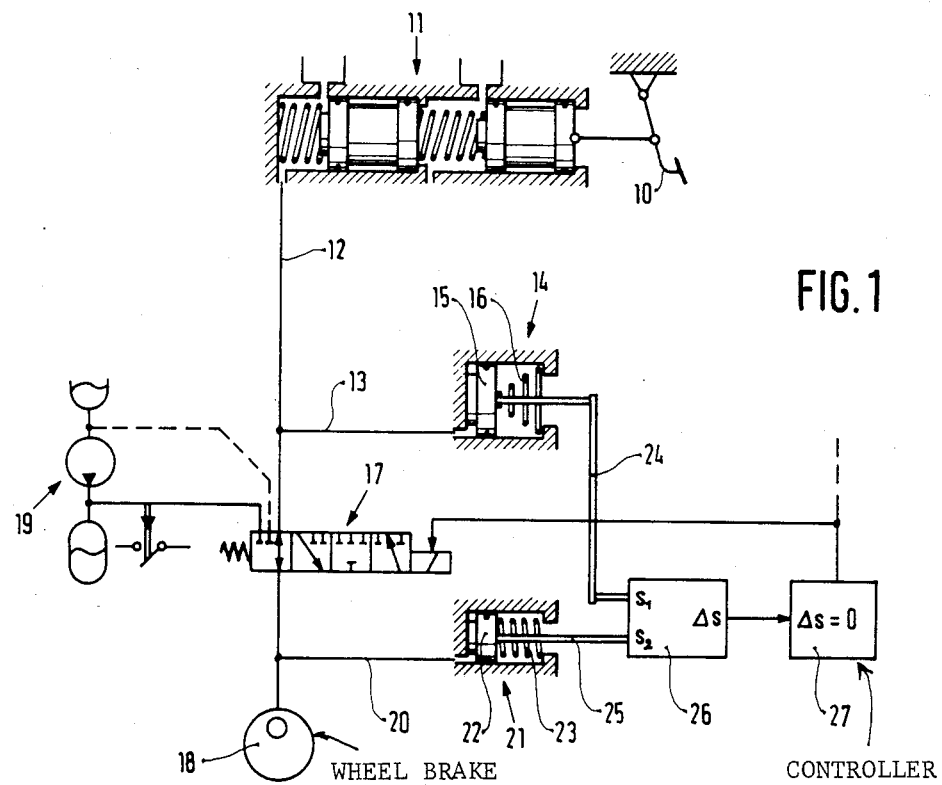
FIG. 1 is a schematic diagram of an automotive vehicle braking system and utilizing the differential sensor of the present invention.

FIG. 1 illustrates, in general, the principal arrangement of a power assisted braking system of an automotive vehicle. A brake pedal 10, which is operator controlled, moves a piston within a main cylinder 11 to pressurize braking fluid, typically hydraulic fluid, within a pressure line 12. This pressure is transmitted over a branch line 13 to a path or deflection analog element 14, simulating a certain deflection due to the pressurization in pressure line 12. The deflection simulator 14 has a piston 15 which is spring-loaded by a spring 16. A 4/4 magnetic valve 17 is provided, controlled, for example, by an electric control network 27 for selective pressurization of a brake 18 via the pressure line 12 or, selectively, from a pressurized fluid supply 19. In dependence on the position of the 4/4 magnetic valve, pressure, thus, is either directly applied from the pressurized line 12 or from the supply 19; it may be increased, held at a constant level, or dropped by the pressurized supply 19.

The actual braking pressure within the wheel brake 18 is sensed by a branch line 20 and applied to a comparison element 21 which has a piston 22, deflectable against the force of a spring 23.

The two pistons 15, 22 are connected to links 24, 25, respectively, to transfer the respective positions $s_1$, $s_2$ of the pistons 15, 22 to a position difference sensor 26. The output of the position difference sensor 26 provides a difference signal $\Delta s$. The signal $\Delta s$ is applied to the control element 27 and is processed within the control element 27 for control of the magnetic valve 17.

Operation of system of FIG. 1: The piston 15 of the deflection simulator 14 is deflected or moved by a distance which is an analog of/or corresponds to the distance of deflection of the brake pedal 10. The deflection of the piston 22 of the comparison cylinder 21 corresponds to the actual pressure within the wheel brake 18. The controller 27 is so arranged that it commands a braking pressure in which the position difference of the pistons 15 and 22 is nulled, that is, operates to cause the position difference to become zero. In this manner, it is possible to adjust the braking power amplification by different cross-sectional areas of the respective pistons 15 and 22.

The foregoing assumes, however, that the position difference sensor 26 provides a signal $\Delta s$ which corresponds, precisely, to the difference of the absolute positions of the respective pistons, that is, to the difference of the distances $s_1$ and $s_2$.

Figure 2:
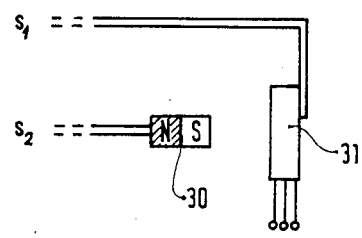
FIG. 2 is a differential sensor in accordance with the prior art.

It has previously been proposed to utilize a sensor in accordance with FIG. 2, in which the piston 22, deflected over the distance $s_2$, is coupled to a permanent magnet 30, and piston 15 is coupled to a Hall element 31 which, preferably, is part of an integrated circuit network.

Figure 3A:
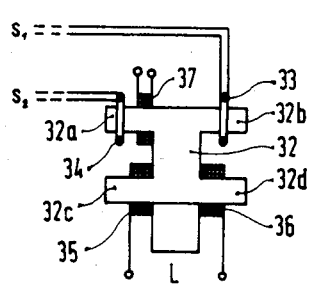
FIG. 3A is a schematic side view of the sensor in accordance with the present invention.

Embodiment of FIG. 3A: The differential position sensor utilizes a short-circuit ring sensor which is constructed in form of an H, or double-U core 32, having salient pole pieces 32a, 32b, 32c, 32d. Short-circuit rings 33, 34 are slidably located on the salient poles 32b, 32a, respectively. Coils 35, 36, electrically connected in series, are located on the salient poles 32c, 32d. These coils provide an overall inductance L. A further coil 37 is located on the pole 32a.

Operation of the sensor, FIG. 3A: The respective salient poles 32a, 32c and 32b, 32d, respectively, form open magnetic circuits with the associated coils 35, 36, respectively. The inductance of the respective magnetic circuit, as well known, will change upon movement of the short-circuit rings 33, 34 on the respective salient poles 32b, 32a. Upon change of the relative position of the rings 33, 34, with respect to each other, the inductance L likewise will change. If the short-circuit rings 33, 34 are deflected in the same direction, the inductances of the respective separate circuit will change, but the overall inductance, L, will remain constant. A signal, corresponding to the difference in deflection of the short-circuit coils thus can be determined by measuring the overall inductance of the coils 35, 36, that is, the inductance L.

Figure 3B:
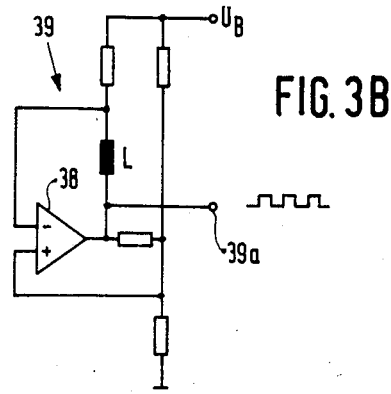
FIG. 3B is a circuit diagram of an evaluation circuit for the sensor of FIG. 3A.

A circuit which is particularly suitable for the evaluation of the inductance is shown in FIG. 3B. An oscillator 39 is provided, which includes, primarily, an operational amplifier 38 which has the inductance L, that is, the two serially connected coils 35, 36, connected in a feedback circuit therein. An operation voltage $U_B$ is connected to the circuit. The output terminal 39a will have a square-wave signal appear thereat, which has a frequency corresponding to the inductance L. The controller 37 is then provided with a reference frequency, and the signal at terminal 39 is compared with the reference frequency, as well known. If the signal at terminal 39a and that of the reference frequency are the same, then the relative position of the two coils 33, 34 will be in a predetermined relationship; any deviation from this predetermined relationship will indicate a relative excursion of one of the coils with respect to the other, which relative excursion can then be utilized to control the pressure in the wheel brake 18 to null any such difference. As can be seen, the circuit of FIG. 3B requires only a few circuit elements, so that a particularly simple arrangement is provided. The feedback oscillator circuit, as such, is standard, and the various resistors shown in the circuit, besides the operational amplifier 38 and the inductance L are connected in the usual manner.

Coil 37 is not strictly necessary, but may be used, as shown, to obtain an absolute value for the position of one or the other of the objects, here the pistons 15, 22; a similar coil can be applied to the leg 32b of the core. With such additional coils it is possible to obtain absolute values for the position of the respective objects.

Figure 4A:
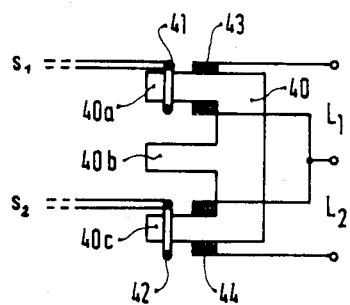
FIG. 4A is a side view of another embodiment.

Embodiment of FIG. 4A: The core is an E-core 40, having salient legs 40a, 40b, 40c. Short-circuit rings 41, 42 are located to surround the legs 40a, 40c. Serially connected coils 43, 44, having respective inductances $L_1$, $L_2$ are wound on the poles or legs 40a, 40c. By a suitable circuit connection of the coils 43, 44, a signal will be generated which is representative of the difference in position of the short-circuit coils 41, 42, by sensing the difference in respective inductance $L_1$, $L_2$ of the respective coils 43, 44. Control for a predetermined difference in position then will correspond to a control in which, for example, the difference in the inductances $L_1$, $L_2=0$; or, respectively, the relationship of the inductances $L_1/L_2=1$.

Figure 4B:
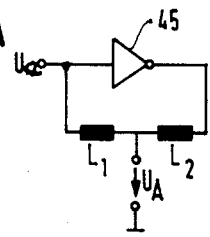
FIG. 4B is a diagram of an evaluation circuit for FIG. 4A.

The evaluation circuit for the system is particularly simple—see, for example, FIG. 4B. The input and output of an inverter 45 have, respectively, the series circuit of the inductances $L_1$, $L_2$ connected thereacross. A source of alternating voltage $U_a$ is applied through the input of the inverter. An output signal $U_A$ can be obtained from the junction of the coils forming the inductances $L_1$, $L_2$ with respect to ground or chassis. As can readily be seen, the output voltage $U_A$ is zero or null, if the inductances have the same value. Since the output voltage $U_A$ is an alternating voltage—assuming relative displacement of the object, and hence of the coils 41, 42, deflection from the position can readily be recognized by sensing the phasing of the output voltage $U_A$ with respect to the input voltage $U_a$.

Figure 4C:
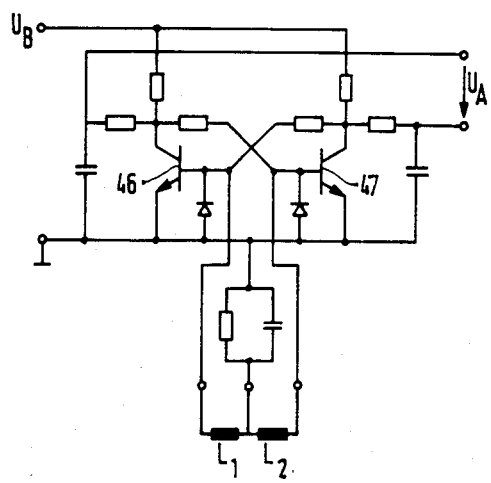
FIG. 4C is a diagram of another evaluation circuit for the sensor of FIG. 4A.

A different type of evaluation circuit is shown in FIG. 4C. An astable multivibrator, having transistors 46, 47, is provided, connected in accordance with well known and customary circuit configuration. The bases of the transistors 46, 47 are connected to the outer terminals of the coils 43, 44. The junction point of the coils 43, 44, forming the inductances $L_1$, $L_2$, is connected to ground or chassis through a coupling network, for example a resistor—capacitor network as shown. The output voltage $U_A$ is taken off the astable multivibrator from the collector resistors of the transistors 46, 47.

Figure 4D:
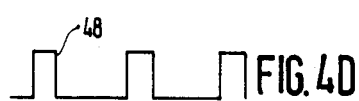
FIGS. 4D and 4E are pulse diagrams arising in the system of FIG. 4C.
Figure 4E:

The output voltage $U_A$ of FIG. 4C is shown at 48 in FIG. 4D. This is the condition if the inductances $L_1$, $L_2$ are not the same. FIG. 4E shows the output voltage $U_A$ as the pulse sequence 49, if the inductances of the coils $L_1$, $L_2$ are equal. As can readily be seen, the duty cycle, or the pulse—gap ratio of curve 49 is 1:1, whereas the curve 48 has a pulse/pulse gap ratio other than 1:1. The controller 27 then must be arranged to react to null the hydraulic pressure to achieve a duty cycle of 1:1. The direction of control is governed by sensing whether the relationship of pulse length to pulse gaps is greater or less than unity.

Figure 5A:
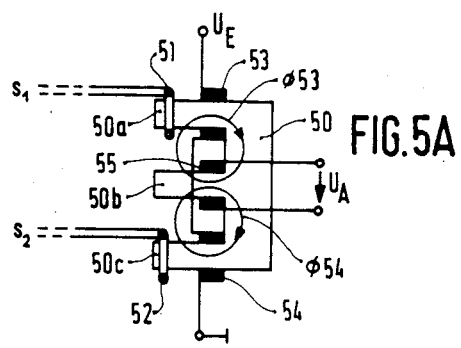
FIG. 5A is a side view of another form of a sensor.

Embodiment of FIG. 5: The sensor shown in FIG. 5A has an E-core 50 with salient poles 50a, 50b, 50c. Short-circuit rings 51, 52 can slide along the salient poles 50a, 50c. Serially connected coils 53, 54 are wound on the E-core. Contrary to the prior embodiment of FIG. 4, however, the directions of winding of the respective coils 53, 54 are opposite each other, so that the respective resulting magnetic flux lines $\phi 53$ and $\phi 54$ subtractively combine in the center leg 50b. In contrast to the embodiment in accordance with FIG. 4A, however, the output voltage $U_A$ is not taken off the coils 53, 54, but rather from a further sensing coil 55 which is wound on the center leg 50b of the core 50. The serially connected coils 53, 54 are supplied with an input voltage $U_E$.

Figure 5B:
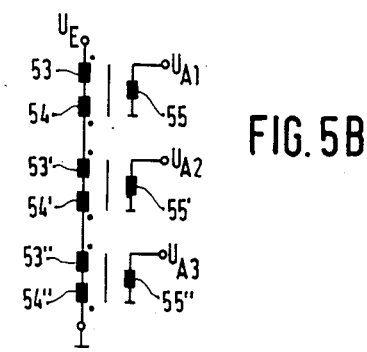
FIG. 5B is a circuit diagram illustrating combination of a plurality of sensors in accordance with FIG. 5A or FIG. 6.

FIG. 5B illustrates how a possibility of sensors can be serially connected, as shown, schematically, by coils 53, 54, 53', 54', 53'', 54''. Each one of these coils, on their respective cores or core portions, has a sensing coil 55, 55', 55'' associated therewith, on which the respective output voltages $U_{A1}$, $U_{A2}$, $U_{A3}$ can be sensed. Such a series connection is particularly suitable if one system has a plurality of sensing positions associated therewith.

Figure 5C:
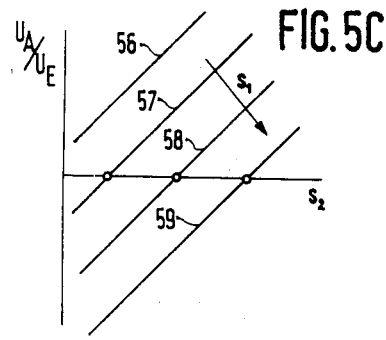
FIG. 5C is a diagram of the output voltage of a sensor in accordance with FIG. 5A or FIG. 6.

The output signal $U_A$, normalized with respect to the input signal $U_E$ with respect to the absolute position $s_2$ of the short-circuit ring 52, is shown in FIG. 5C. The respective curves 56, 57, 58, 59 represent the absolute position $s_1$ of the short-circuit ring 51. If the controller 27 is set to the respective null or zero position, control of the positional difference $\Delta s = 0$, will then result. The phase position of the voltage $U_A$ will provide recognition of the direction of the positional difference from the zero or null, or equal position of the respective objects, as transmitted to the short-circuit rings 51, 52.

Figure 6:
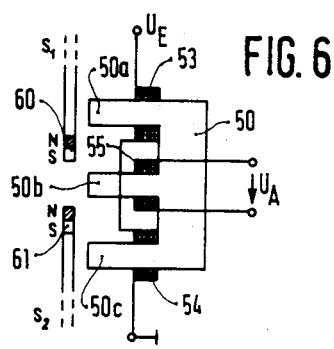
FIG. 6 is a schematic side view of another embodiment of the sensor.

The embodiment of FIG. 6 is, electrically, equivalent to that shown in FIG. 5A, but differs merely in that the two magnetic circuits of the E-core 50 are not influenced, magnetically, by short-circuit rings 51, 52, but rather by magnets 60, 61 which, preferably, are movable perpendicularly with respect to the poles or legs 50a, 50c. The magnets 60, 61, by controlling permeability, influence the field lines between the salient poles 50a, 50b and/or 50b, 50c, respectively, so that the magnetic phenomena with respect to the core will be similar to those described in connection with the sensor of FIG. 5A. The circuit of FIG. 5B is equally suitable in the structure of FIG. 6, and the output signal $U_A$ has the characteristics of FIG. 5C.

In accordance with a preferred embodiment of the sensor in accordance with FIG. 6, the E-core 50 is constructed in form of a thin ferromagnetic sheet metal plate, preferably mu-metal, or amorphous magnetic material. By using magnets 60, 61, a particularly sensitive structure results, in which a high differential signal is obtained upon differential positioning of the respective objects.

In the embodiments described, the cores 32, 40, 50 are positioned, fixed in space; the short-circuit rings 33, 34; 41, 42; 51, 52 or the magnets 60, 61, respectively, are deflected in accordance with respective objects, in case of a braking system, the pistons 15, 22. Of course, it is equally possible to maintain one of the objects fixed in space and deflect the core element and the other object in respectively cinematically opposite direction.

Coils similar to coil 37—FIG. 3A—may be used with any one of the embodiments, in order to obtain an absolute value for the position of the respective object.

In a preferred embodiment of the invention, temperature coefficients are considered. This can be readily obtained by selecting a wire for the various coils such that the temperature coefficient of resistance of the wires used in the sensor becomes zero. Nickel wire is suitably preferred.

The sensor can be utilized for various applications and its application is not restricted to that of automotive braking systems; it is suitable for any application in which a difference in position between movable objects is to be determined with precision, and particularly where simplicity of evaluation circuitry is important.

Various changes and modifications may be made, and features described in connection with any one of the embodiments may be used with any of the others, within the scope of the inventive concept.

In an actual embodiment, the following values were found suitable:

In FIG. 4B, voltage $U_a$: 12 V, pulse shape
inverter 45: CMOS CD 4069
coils 43, 44: 300 windings, 1 ... 3 mH depending on the position of the short-circuit ring
In FIG. 5A or FIG. 6, coils 53, 54: identical with 43, 44
coil 55: identical with 53,54
voltage $U_E$: 12 V puls shape at a frequency of 5.0 ... 50.0 kHz.

I claim:

1. Relative or differential position sensor, to determine the relative position of two independently linearly movable objects (15, 22) with respect to a reference, having
    an H-shaped magnetic core (32) including a yoke and a plurality of salient legs or poles, at least two of said legs (32c, 32d) being located in alignment with each other and each having a winding thereon which, when energized, produces a magnetic field and forms, in combinations with the yoke, a magnetic circuit including magnetic field lines;
    a first one of said windings (35), located on a first one of the salient legs (32c);
    a second one of said windings (36), located on a second one of the salient legs (32d), said first and second windings being located, respectively, on two aligned salient poles, being serially connected to form an inductance (L) and the magnetic field lines of said first and second coils superposing or combining in a common region of said core;
    two magnetic circuit control means (33, 34) coupled to the legs on which said windings are wound, and respectively coupled to said two objects, the relative position of which is to be determined; and
    inductance sensing means (38, 39), including an oscillator, coupled across outer terminals of said windings and evaluating the difference, if any, between the inductances of the magnetic circuits produced by the respective salient legs and said windings.

2. Sensor according to claim 1, wherein (FIG. 3) the magnetic circuit control means comprises short-circuit rings (33, 34).

3. Sensor according to claim 1, further including an additional absolute position sensing coil (37) located on at least one of the salient poles or legs (32a, 32b) to determine the absolute position of one of the objects by sensing the inductance which includes the magnetic circuit on which said further sensing coil is wound.

4. Sensor according to claim 1, wherein said first and second coils (35, 36) are wound with a wire having a predetermined temperature coefficient of resistance to balance output changes with temperature from the sensor.

5. Relative or differential position ensor, to determine the relative position of two independently linearly movable objects (15, 22) with respect to a reference, having (FIGS. 4A, 5A, 6)
    an E-shaped magnetic core (40, 50) including a yoke and a plurality of salient legs or poles, at least two outer ones of said legs (40a, 40c; 50a, 50c) each having a winding (43,44; 53,54) thereon which, when energized, produces a magnetic field and forms, in combination with the yoke, a magnetic circuit including magnetic field lines;
    a first one of said windings (43,53), located on a first one of the salient legs (40a, 50a);
    a second one of said windings (44,54), located on a second one of the salient legs (40c, 50c), said first and second windings being serially connected and having respective inductances (L1, L2), and the magnetic field lines of said first and second coils superposing or combining in a common region of said core;
    two magnetic circuit control means (33, 34; 41, 42; 51, 52; 60, 61), positioned with respect to said core to affect the magnetic circuit between the respective outer legs and the center leg (40b, 50b) of the core, coupled to the legs on which said windings are wound, and respectively coupled to said two objects, the relative position of which is to be determined; and
    inductance sensing means (45; 46, 47; 55) coupled to said windings and evaluating the difference, if any, between the inductances of the magnetic circuits produced by the respective salient legs and said windings.

6. Sensor according to claim 5, wherein (FIG. 6) the magnetic circuit control means comprises magnets (60, 61) movable in an air gap between adjacent salient legs or poles.

7. Sensor according to claim 5, wherein (FIG. 4C) the inductance sensing means comprises an astable multivibrator, having a pair of flip-flop transistors (46, 47);
    the coils (43, 44) being serially connected to the bases of said transistors, whereby the pulse/pulse gap ratio of the output voltage derived from the collectors of the transistors will be representative of the relative position of the magnetic circuit control means with respect to the salient poles or legs of the core, and, when the duty cycle or said relation is 1:1, a predetermined balanced position of said magnetic circuit means is indicated.

8. Sensor according to claim 5, wherein (FIGS. 5A, 6) the core (50) has at least three salient legs or poles (50a, 50b, 50c);
    at least two coils (51, 52) are provided, located on respective salient poles or legs to form a plurality of magnetic circuits ($\phi$53, $\phi$54), the circuit including an intermediate leg (50b) located between a pair of outer legs (50a, 50c) on which said first and second coils are wound;
    means ($U_E$) applying an operating voltge to the coils;
    and further including a sensing coil (55) wound on the intermediate salient pole or leg (50b), the inductance sensing means being connected to said sensing coil (55).

9. Sensor according to claim 8 wherein (FIGS. 4A, 5A) the magnetic circuit control means comprises short-circuit rings (41, 42, 51, 52) slidable on the outer salient poles or legs of the core.

10. Sensor according to claim 8, wherein a plurality of sensors have their respective first and second windings (53, 54; 53', 54'; 53", 54") serially connected, and said means providing the operating voltage ($U_E$) is connected, in common, to the serial connection of said windings.

11. Sensor according to claim 8, wherein (FIG. 6) the magnetic circuit control means comprises magnets (60, 61) movable in an air gap between the respective outer salient poles or legs (50a, 50c) and the center pole or leg (50b).

12. Sensor according to claim 11 wherein the core (50) comprises a thin ferromagnetic sheet-metal element.

13. Sensor according to claim 12 wherein the sheet-metal element comprises mu-metal.

14. Relative or differential position sensor, to determine the relative position of two independently linearly movable objects (15, 22) with respect to a reference, having
  an E-shaped magnetic core (40, 50) including a yoke and a plurality of salient legs or poles, at least two outer ones of said legs each having a winding thereon which, when energized, produces a magnetic field and forms, in combination with the yoke, a magnetic circuit including magnetic field lines;
  a first one of said windings (43), located on a first one of the salient legs (40a, 50a);
  a second one of said windings (44), located on a second one of the salient legs (40c, 50c), said first and second windings being serially connected and having respective inductances (L1, L2), and the magnetic field lines of said first and second coils superposing or combining in a common region of said core;
  two magnetic circuit control means (41, 42; 51, 52; 60, 61), positioned with respect to said core to affect the magnetic circuit between the respective outer legs and the center leg (40b, 50b) of the core, coupled to the legs on which said windings are wound, and respectively coupled to said two objects, the relative position of which is to be determined; and
  inductance sensing means (45; 46, 47; 55) coupled to said windings and evaluating the difference, if any, between the inductances of the magnetic circuits produced by the respective salient legs and said windings, said inductance sensing means comprising
  means ($U_A$) applying an alternating voltage across one of the coils;
  means ($U_A$-45) applying the alternating voltage 180° out-of-phase or inverted, across the other of the coils; and
  means sensing the voltage at the junction of the two coils to determine if the voltage at said junction is zero, indicative of balanced inductance of said coils and of a predetermined position of said magnetic circuit control means with respect to the salient poles of the core.

15. Sensor according to claim 14, wherein (FIG. 6) the magnetic circuit control means comprises magnets (60, 61) movable in an air gap between the respective outer salient poles or legs (50a, 50c) and the center pole or leg (50b).

16. Sensor according to claim 14, wherein (FIGS. 4A, 5A) the magnetic circuit control means comprises short-circuit rings (41, 42, 51, 52) slidable on the outer salient poles or legs of the core.

17. Sensor according to claim 14 wherein the means applying an inverted voltage comprises an inverter (45) connected to said source of alternating current voltage.

18. The combination of a relative or differential position sensor, to determine the relative position of two independently linearly movable objects (15, 22) with respect to a reference, having
  a magnetic core (32, 40, 50) including a yoke and a plurality of salient legs or poles, at least two of said legs each having a winding thereon which, when energized, produces a magnetic field and forms, in combination with the yoke, a magnetic circuit including magnetic field lines;
  a first one of said windings (35, 43, 53), located on a first one of the salient legs (32c, 40a, 50a);
  a second one of said windings (36, 44, 54), located on a second one of the salient legs (32d, 40c, 50c), said first and second windings being serially connected and the magnetic field lines of said first and second coils superposing or combining in a common region of said core;
  two magnetic circuit control means (33, 34; 41, 42; 51, 52; 60, 61) coupled to the legs on which said windings are wound, and respectively coupled to said two objects, the relative position of which is to be determined; and
  inductance sensing means (38, 39; 45; 46, 47; 55) coupled to said windings and evaluating the difference, if any, between the inductances of the magnetic circuits produced by the respective salient legs and said windings; with
  a vehicle braking system, wherein:
  a displacement simulating apparatus (14) is provided, having a first piston (15), the deflection of which is representative of the deflection of a brake pedal (10); and
  an actual braking pressure cylinder (21) is provided, having a second piston (22), the deflection of which is representative of actual braking pressure in a wheel of the vehicle;
  said pistons (15,22) forming the two objects, the differential position of which is to be sensed with respect to the chassis of the vehicle, which chassis forms the reference;
  and wherein said pistons are coupled (24,25) to the respective magnetic circuit control means, to provide an output signal representative of the respective differential deflection of said pistons upon operation of the brake pedal.

* * * * *